US008876027B2

(12) United States Patent
Oehr et al.

(10) Patent No.: US 8,876,027 B2
(45) Date of Patent: Nov. 4, 2014

(54) UPGRADED COMBUSTION ASH AND ITS METHOD OF PRODUCTION

(75) Inventors: Klaus Oehr, Surrey (CA); Rod McElroy, Vancouver (CA); Michael Kiktavy, Burnaby (CA)

(73) Assignee: Sonoash LLC, Walnut Creek, CA (US)

( * ) Notice: Subject to any disclaimer, the term of this patent is extended or adjusted under 35 U.S.C. 154(b) by 708 days.

(21) Appl. No.: 12/996,352

(22) PCT Filed: Jun. 4, 2009

(86) PCT No.: PCT/US2009/046315
§ 371 (c)(1),
(2), (4) Date: Feb. 14, 2011

(87) PCT Pub. No.: WO2009/149298
PCT Pub. Date: Dec. 10, 2009

(65) Prior Publication Data
US 2011/0120348 A1    May 26, 2011

Related U.S. Application Data

(60) Provisional application No. 61/059,208, filed on Jun. 5, 2008.

(51) Int. Cl.
| | | |
|---|---|---|
| B02C 19/00 | (2006.01) | |
| B02C 17/14 | (2006.01) | |
| B02C 19/18 | (2006.01) | |
| C04B 20/02 | (2006.01) | |
| B02C 23/08 | (2006.01) | |
| B02C 23/18 | (2006.01) | |
| C04B 18/06 | (2006.01) | |
| B02C 17/20 | (2006.01) | |
| B03B 9/04 | (2006.01) | |
| C04B 18/08 | (2006.01) | |
| B03D 1/02 | (2006.01) | |

(52) U.S. Cl.
CPC ............ *B02C 17/20* (2013.01); *B02C 19/18* (2013.01); *C04B 20/026* (2013.01); *B02C 23/08* (2013.01); *B02C 23/18* (2013.01); *B03D 1/02* (2013.01); *C04B 18/061* (2013.01); *B03B 9/04* (2013.01); *C04B 18/081* (2013.01)
USPC .............................. 241/1; 241/175; 241/184

(58) Field of Classification Search
USPC ................... 241/1, 24.24, 170–184
See application file for complete search history.

(56) References Cited

U.S. PATENT DOCUMENTS 6,126,014 A * 10/2000 Gray et al. .................... 209/163
7,896,267 B2 * 3/2011 Ishigaki et al. .................. 241/1

FOREIGN PATENT DOCUMENTS

| JP | 2000-196731 | 1/2002 |
| JP | 2006-047764 | 9/2007 |

* cited by examiner

*Primary Examiner* — Faye Francis

(57) ABSTRACT

Described and claimed herein is a method of producing enhanced combustion ash for use in pozzolanic applications or cement clinker manufacture. The method employs a primary process in which wet or dry feedstock is pulverized with sonication using one or more grinding media having a maximum component size of about 2 mm. Alternatively, the media may have a true grinding medium volume to chamber volume ratio of at least 0.29. Also disclosed an claimed is an enhanced combustion ash produced by the method, whereby the enhanced combustion ash has one or more qualities that make it particularly suitable in pozzolanic applications or cement clinker manufacture.

27 Claims, 1 Drawing Sheet

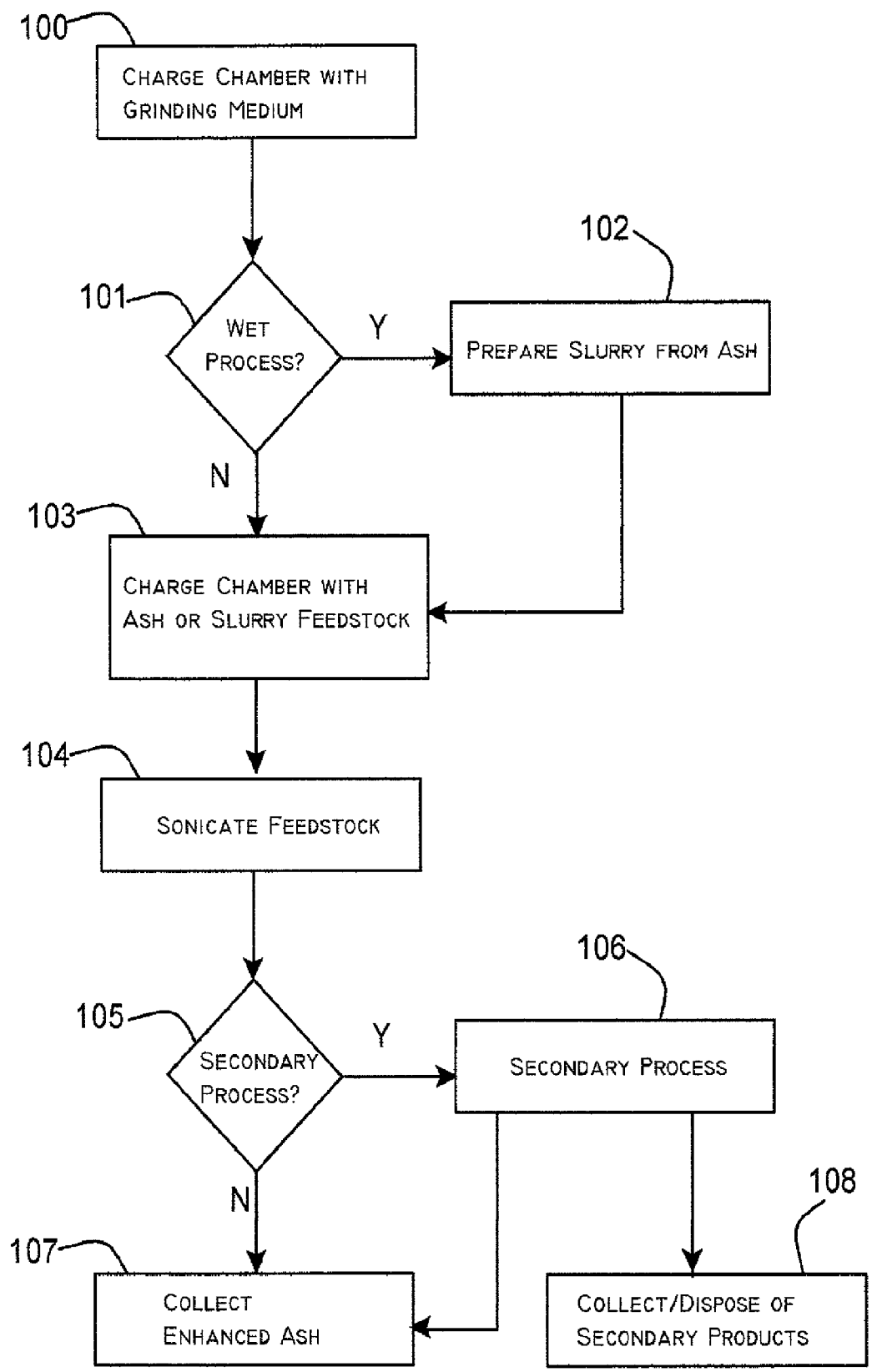

UPGRADED COMBUSTION ASH AND ITS METHOD OF PRODUCTION

FIELD

The present invention relates to combustion ash, and more specifically to methods of enhancing combustion ash for use as cementitious or pozzolanic additives to blended cements or cement kiln raw material.

BACKGROUND OF THE INVENTION

A pozzolan is a material, which when combined with calcium hydroxide, exhibits cementitious properties in the presence of water. Pozzolanic ash can be used as a component of blended cements, if it meets certain quality specifications or is sufficiently upgraded. Cement clinker components release calcium hydroxide during hydration necessary to convert pozzolan to cementitious material. Some ash is cementitious on its own; e.g. subbituminous or most lignite coal ash.

The technical benefits gained from the addition of such materials, including pozzolans or coal derived cementitious ash, especially very fine materials, include reduced use of Portland cement per unit volume of concrete, and increased strength and reduced water permeability of the concrete product. For example, it is generally accepted that fly ash with fine particles will participate more rapidly and completely in the cementitious reactions of blended cement concrete than fly ash with coarse particles. Sieved ash gave higher compressive strengths in concrete with lower water demand than the original coarse ash ("Pulverised Coal Ash—Requirements for Utilization", IEA Coal Research, 1996). Economic benefits arise from the reduction in the amount of Portland cement used, and from the higher quality concrete produced. Environmental benefits arise from reduced energy use (e.g. reduced greenhouse gas emissions) in cement manufacture. Use of waste materials such as high carbon bituminous coal fly ash as pozzolan provides additional economic and environmental benefits by reducing the amount of material that must be disposed of in landfills, etc.

The value of bituminous coal fly ash as pozzolan is limited by its carbon content which adsorbs costly organic concrete additives such as air entrainers, as well as affecting the colour of the concrete. The value of bituminous coal fly ash as a pozzolan is enhanced by reducing its particle size, which increases the surface area and reactivity of silica and siliceous materials towards the free calcium hydroxide generated by hydration of Portland cement as well as reducing water porosity and increasing compressive strength of the resulting concrete. Particle size reduction also results in carbon liberation (breaking apart carbon and siliceous ash), thus facilitating separation of the carbon from mineral ash.

It is well known that high levels of ammonia in cementitious materials and pozzolans are detrimental to blended cement and concrete applications since alkaline cement (e.g. Portland) becomes highly alkaline on addition of water which releases ammonia in the cementitious or pozzolanic material to undesirable levels. It would be desirable to reduce the ammonia level of cementitious materials and pozzolans including fly ash.

Because of the foregoing problems, individuals and companies in the field have endeavoured to enhance the quality of pozzolanic ash products. For instance, it is well known that particle size reduction enhances the value of pozzolanic or cementitious combustion ash for both blended cement applications and cement kiln raw material input. For example, and more specifically, particle size reduction of ash enhances early strength of blended cements. ASTM Method C618 requires that the amount of ash retained on a 45 micron sieve be less than 34% of the ash input to blended cement. Some ashes do meet this specification without grinding.

Minkara and Heavilon (U.S. Pat. No. 5,840,179) describe the use of ultrasonic energy to condition a fly ash-water slurry prior to carbon removal by froth flotation. The patent describes a "conditioning" treatment in which a fly ash-water slurry is subjected to high intensity ultrasound treatment. A "conditioning", or surface active, agent selectively wets the carbon surfaces with oleophilic material. Carbon-rich particles are recovered after conditioning by flotation, providing an upgraded fly ash pozzolan product. The purpose of this invention is to enhance fly ash as a pozzolan to reduce its carbon content and/or increase fineness (reduce particle size) and increase surface area. This patent indicates that prior art mechanical conditioning of ash before carbon flotation is typically one-half hour or more and is believed to reduce or degrade the pozzolanic quality of the fly ash pozzolan (see column 2, lines 11 to 43). This invention achieved median particles size reduction of 31% and 59% for American and Columbian bituminous coal fly ash respectively (see column 5, lines 1 to 4). Finally, this invention achieved a maximum increase in particle surface area of 65% (see table in columns 9 and 10).

In spite of useful fly ash pozzolan enhancement, the process of Minkara and Heavilon suffers from several disadvantages, including high cost and limited lifetime of ultrasound transducers and horns; inefficient use of energy; and potential for slurry short-circuiting around the equipment, which are effectively point sources.

Gray et al (U.S. Pat. No. 6,126,014) describe an agglomeration/flotation process for concentration of carbon-bearing material in fly ash. Although this method provides high carbon recovery at moderate purity, residual ash composition and pozzolanic properties are not specified. Disadvantages of the Gray process include use of expensive light hydrocarbon solvent with limited recovery; explosion hazard in the presence of air; and limited capability to liberate carbon particles attached to mineral ash.

One important parameter that determines the quality of combustion ash with respect to pozzolanic applications is the size of the ash particles, which determines the specific surface area. Processes and devices, such as Pearl mills, are known in the art that are capable of producing ash particle sizes at or below 5 μm. However, such pulverization processes require hours, which significantly detracts from their utility and, in some cases, from the quality of the product. A process having a pulverization of time below 10 minutes, preferably below 5 minutes, more preferably at or below 3 minutes and even as low as 1 minute and yet producing ash particles with a median size of less than 20 μm and surface areas of 0.9 m$^2$/g or higher, would be a very significant advance in the field.

Use of high silica materials such as clay, shale, sand and combustion ash as raw materials to cement kilns in cement clinker production is well known and widely practiced. U.S. Pat. No. 6,391,105 to Oates et al. indicates that the yield of cement clinker recovered from a kiln is enhanced by feeding fly ash into the hot clinker and that, in general, smaller particles more readily partially fuse into the hot clinker at a given temperature and exposure time. The prior art has not revealed how smaller combustion ash particles can be generated rapidly.

Accordingly, there exists a need for a practical, economical, large-scale process that can quickly upgrade combustion ash by increasing the specific surface area and decreasing the particle size. Such a process that includes or contributes to the reduction of ammonia, sulphur, and/or carbon content of the ash would have even greater utility. Such a process should achieve these enhancements while reducing pulverization time in order to minimize equipment costs, operating costs, and pozzolanic properties of the combustion ash, or its value as a cement kiln raw material. Ideally, the process would be amenable to being performed with equipment that is readily available, without the necessity of constructing equipment de novo.

SUMMARY OF THE INVENTION

We disclose herein both dry and wet methods for quickly and cost-effectively upgrading combustion ash in order to enhance numerous qualities of the ash, for instance greatly increased specific surface area; decreased ash particle size, more favourable particle size distribution, and significant reductions of ammonia, sulphur, and carbon. In addition, pulverization of ash can be achieved, in either dry or wet mode, without ultrasonic processing and with a processing time typically much shorter than the prior art; for instance, 1 to 3 minutes vs. 10 minutes to hours required by the prior art. The ash pulverized by the current invention can be easily further processed via secondary processes such as flotation, triboelectric separation, air classification, sieving, or other methods to further enhance its properties.

The process disclosed and claimed herein can be carried out with easily obtainable equipment such as an acoustic frequency sonicator of the type described by Nyberg et al., U.S. Pat. No. 5,005,773. Because the sonication devices employed are of a type that is widely available commercially, the method can be easily and economically practised.

To practice the method a chamber is charged with at least one grinding medium. Preferably, the grinding medium comprises components having a maximum diameter of no more than about 2 mm. The use of such small diameter medium produces beneficial results, disclosed below, which are hitherto unrecognized in the art. The chamber is also charged with the feedstock, which may be dry or slurried pozzolanic material, such as combustion ash. The ash may be derived from a number of sources, such as bituminous coal, subbituminous coal, and lignite coal.

The feedstock is pulverized by sonication produced by applying sonic energy to the chamber. Acoustic energy in a frequency-range of 90-400 Hz is preferred. The sonication is applied for a brief period of time, which may be from 1 to 10 minutes and more preferably from 1 to 3 minutes which is significantly less than prior art methods. The enhanced combustion ash can be collected, with, optionally, a final sieving step.

Alternatively, after the sonication step the feedstock may be exposed to one or more secondary processes, which may be, for instance, froth flotation, triboelectric separation, air classification, vibratory separation, and sieving.

Also disclosed and claimed herein is an enhanced combustion ash produced by the foregoing method. Such an ash has superior qualities for pozzolanic applications. Such qualities include small particle size, large specific surface area and decreased contaminant levels such as carbon, sulphur, and ammonia. Such ash also has superior qualities as a raw material for cement clinker production, for example Portland cement clinker production, due to its high surface area and small particle size.

As used herein, the terms "grinding" and "pulverization" are equivalent and interchangeable. "Sonic grinding" and "sonic pulverization" refer to processes whereby material is simultaneously ground and subjected to acoustic frequency vibrations. "Sonication", "sonic conditioning" and "acoustic sonication" are also equivalent and interchangeable and refer to processes whereby material is subjected to acoustic frequency vibrations without being subjected to grinding. Unless otherwise limited or specified, the term "acoustic frequency" refers to the acoustic frequency range of about 20 Hz to 19,999 Hz. Acoustic frequencies are distinguished herein from ultrasonic frequencies, which are generally considered to be at or above 20,000 Hz.

BRIEF DESCRIPTION OF THE DRAWING

FIG. 1 represents a flow diagram illustrating the major steps of the process of the invention.

DETAILED DESCRIPTION OF THE INVENTION

The process of the invention can be easily understood with reference to FIG. 1. The steps of the invention are not presented in FIG. 1 necessarily in the order in which they must be performed, unless the order of steps is inherent in the method or specified.

At step 100, a chamber for pulverizing the ash feedstock is charged with at least one grinding medium. The chamber has a chamber volume ("CV") and is normally a part of a sonicator apparatus such as the sonicator described by Nyberg et al in U.S. Pat. No. 5,005,773. This is a commonly used apparatus and is conveniently used as an example in this disclosure of the preferred embodiment of the invention. However, it will be recognized by those of skill in the art that the invention is not limited by the specific type of sonicator employed. Furthermore, the Nyberg device may be effectively used with modifications. For instance, although Nyberg discloses two chambers attached to a resonant bar of the sonicator, the present invention can be easily carried out with a single chamber. Although the examples provided below use a single chamber having a CV of about 3 liters, larger, smaller, and/or multiple chambers could be used on one sonicator.

The characteristics of the grinding media used to charge the chamber at Step 100 determine the success of the process in producing the combustion ash having the desired characteristics in the desired time. As demonstrated below, we have found that using grinding media having a maximum component diameter of about 2 mm or less can achieve these objectives.

Additionally, or alternatively, the media of the invention may be characterized such that a ratio of the true grinding medium volume ("TMV") to the CV is at least about 0.29. TMV refers to the void free volume of the media and can be calculated by dividing its weight by its specific gravity. The modifier "about" is used herein to acknowledge the well known fact in the art that measurements of media diameter and volumes are not perfectly precise. "About" is intended to mean within a tolerance of ±30% unless otherwise stated.

The invention includes within its scope the use of a plurality of different media. The actual composition of the medium or media used will be a design feature than can be resolved on an ad hoc basis without undue experimentation. A preferred medium is steel shot with an average diameter size of 1.18 mm due to its relatively low cost and availability.

At Step 101 a decision is implemented as to whether to conduct a wet or a dry pulverization as the primary process. The important point here is that the process is amenable to both types of primary processes. It is also to be noted that although Nyberg et al. do not describe wet pulverization of solids with their device, we have found that the wet pulverization method described and claimed herein can be carried out with the Nyberg device or comparable devices.

If a wet pulverization is to be used, a slurry of the ash and a liquid is made at Step 102. For many purposes water is an adequate and preferred liquid. However, depending on the feedstock, desired product qualities, and other factors, a solvent or other liquid may be preferred.

At Step 103 the dry ash or slurry is used to charge the chamber. For example, in a dry pulverization process, media volume of about 60% of the CV is used. The remaining 40% of the CV is filled with the feed stock, typically combustion ash. In a wet pulverization process, the media volume may be about 62%-65%, and the remaining volume of the chamber is filled with the slurry, which may be 2.38:1 solids to water.

At Step 104 sonic energy is applied to the chamber in order to pulverize the combustion ash feedstock. One of the great and unexpected benefits of using grinding media of maximum diameter of less than about 2 mm is that the energy input to the process is greatly reduced since pulverization times at or below 3 minutes can be used. Preferably, acoustic frequencies of about 90 to 120 Hz. are applied, although a wider range of about 90 to 400 Hz may be used. The period of sonication is measured in terms of seconds rather than hours as with the prior art devices. Sonication times of less than 3 minutes are generally sufficient, and, typically, sonication is from about 1 to 3 minutes at a power input at or below 30 kilowatts. As demonstrated below, this unexpectedly short duration of sonication is sufficient to produce an enhanced combustion ash having a very small particle size, a very large surface area, reduced nitrogen and sulphur content, and that is more amendable to secondary processes for removing carbon and other undesirable impurities.

Step 105 is a branch point at which the method enters one or more secondary processes 106 or continues to collection of the ash 107, which may include, for instance, finishing steps such as drying and sieving.

The secondary processes employed may be any process that enhances the quality of the combustion ash. Although the term "secondary process" is used herein in the singular, it is to be noted that term may include a plurality of processes. Secondary processes that may be profitably exploited in tandem with the pulverization method of the primary phase include froth flotation, triboelectric separation, air classification, vibratory separation, selective agglomeration and sieving. Of course, when the feedstock is in a slurry, it is necessary to dry the feedstock before applying some secondary processes. Such drying step is considered herein as part of the secondary process and not separately designated.

Froth flotation to remove carbon is a particularly useful secondary process used in conjunction with our method. Unlike prior art carbon separation methods, which use raw ash with partially embedded carbon, the current invention involves the pulverization of ash via acoustic sonication, which renders the carbon more susceptible to separation because the sonic conditioning reduces embedded carbon fused to the combustion ash. The froth flotation can be significantly enhanced by adjusting the pH of the slurry to within a range of between about 4 and 7 although the combustion ash slurry may have a natural pH in this range.

Vibratory separation methods assume that moisture bonding and Van der Waals attractive forces exist between very fine carbon and mineral particles and that these attractive forces can be broken by physical vibration. They attempt to cause carbon and mineral constituents to migrate in different directions due to density, shape, or angle of repose. Because the carbon found in fly ash is friable and fragments easily, vibratory methods may reduce the average particle size of the carbon and may release ultra-fine mineral particles previously encapsulated within the carbon and vice-versa.

Air classification methods often utilize off the shelf equipment. Separation, whether by fluidization or centrifugal action, is accomplished by attempting to manipulate the aerodynamic drag and density characteristics of differing particles. With very small particles, aerodynamic drag appears to dominate the action of particles entrained in air, so even particles with widely different densities behave similarly.

Carbon separation is dependent on mineral matter having a different average particle size than carbon. Sieving is most frequently assisted by some form of vibration of the screens. Performance of the processes is often affected by vibration motion (for example circular vs. lateral) and vibration frequency. Laboratory testing to determine optimum screen configurations, vibratory motion, and vibratory frequency is conducted prior to final equipment selection or installation. Vibration amplitude and duration of exposure are important parameters as well, to minimize carbon fracture during sieving. With fine powders, it is important to include a stack of sieves upstream of the final sieve in order to avoid blinding of the fine mesh by large particles. Large capacity, fine industrial sieving processes are not common.

Selective agglomeration is carbon separation by oil agglomeration in the case where the second fluid phase is gas, for instance nitrogen. The humidity is adjusted to minimize oil phase sorption on non-carbonaceous material, followed by sieve separation of relatively coarse carbon agglomerate from fine mineral ash.

Following the secondary process 106, the secondary products are collected 108. They are then disposed of or are used or sold if they have commercial value. The enhanced combustion ash is collected 107 for use in making cement such as Portland cement, blended cements containing Portland cement or for other beneficial uses.

The data provided below demonstrate the advantages of the current method with respect to specific examples. The process conditions and parameters were as stated above unless otherwise noted.

EXAMPLE 1

Comparison of Media Diameter and Ash Particle Size with Respect to Prior Art Methods Table 1 compares grinding media use in acoustic frequency sonicators of the Nyberg type. Macas ground sodium metal and Anthony ground fluidized bed combustion ash to reduce its lime content prior to disposal. These data clearly show that as the grinding media diameter decreases and TMV/CV ratio increases, processed ash quality (i.e. surface area) improves even for low grinding times, especially in the presence of water. TMV/CV ratios are higher and grinding media diameters in the current invention are lower than those demonstrated in the prior art. The sonication chamber volume CV was 3 liters for the current invention data in Table Sonication was carried out at 30 kilowatts input power for one sonication chamber.

TABLE 1

| Grinding Media | Grinding media Diameter (mm) | Time (min) | Ash (litres)* | Water (litres) | TMV (litres) | TMV/CV | Ash Surface Area (m²/g) |
|---|---|---|---|---|---|---|---|
| Anthony 2004 | 9.53 | | | | 0.50 | 0.17 | |
| Anthony 2008 | 9.53 | 5-40 | | | 0.40 | 0.20 | |
| Macas 1994 | 6.53 | | | | 0.88 | 0.27 | |
| Alumina | 9.53 | 2 | 1.5 | 0.7 | 0.80 | 0.27 | 0.615 |
| Alumina | 9.53 | 10 | 1.5 | 0.7 | 0.80 | 0.27 | 0.923 |
| Zirconia | 6.35 | 10 | 1.55 | 0.65 | 0.87 | 0.29 | 0.935 |
| Zirconia | 6.35 | 2 | 1.0 | 0.6 | 0.87 | 0.29 | 0.969 |
| Zirconia | 6.35 | 5 | 1.0 | 0.6 | 0.87 | 0.29 | 0.949 |
| Zirconia | 2 | 2 | 1.55 | 0 | 1.20 | 0.40 | 0.594 |
| Zirconia | 2 | 5 | 1.55 | 0 | 1.20 | 0.40 | 0.701 |
| Zirconia | 2 | 2 | 1.5 | 0.7 | 0.96 | 0.32 | 0.954 |
| Steel Shot | 1.18 | 2 | 1.55 | 0.65 | 1.36** | 0.45 | 1.510 |

Anthony 2004 - "Carbonation of FBC Ashes Using Sonic Energy", J. Solid Waste Technology and Management, Volume 30, No. 4 pp.212-220.
Anthony 2008 - "Simultaneous Hydration/Carbonation of FBC Ash by Low-Frequency Sonication". Chemical Engineering and Processing, Volume 47, pp 9-16.
Macas 1994 - U.S. Pat. No. 5,318,228
*Ash litres is bulk litres which includes ash voids
**Total grinding media volume TMV = bulk media volume × (1 − void fraction) e.g. for 1.18 mm steel shot TMV = 2.2 × (1 − 0.38) = 1.36 void fraction for 9.53, 6.35, 2 and 1.18 mm grinding media is 0.498, 0.456, 0.4 and 0.38 respectively.
$m^2/g$ = metres squared/gram

EXAMPLE 2

Dry Pulverization of Subbituminous Coal Fly Ash to Enhance Particle Size Distribution and Surface Area Table 2 compares subbituminous coal fly ash quality after sonication for 1 minute at 90 to 120 Hz frequency, in a baffled (3 baffles) 3.2 liter sonication chamber at 20-25 kilowatts input power using 1.18 mm steel shot grinding media without water addition. The bulk grinding media volume and bulk ash volume were approximately 60% and 40% respectively of the sonication chamber volume.

TABLE 2

| | Raw Ash | Dry Pulverized | % Improvement Dry Pulverization vs. Raw Subbituminous Ash |
|---|---|---|---|
| D10 μm | 0.9 | 0.6 | 50 |
| D50 μm | 9.3 | 8.4 | 10 |
| D90 μm | 45.9 | 37.4 | 19 |
| Specific Surface Area (m²/g) | 3.23 | 3.93 | 22 |

The D10, D50 and D90 values in the above table refer to 10, 50 and 90 weight % portions of the sample having a mean diameter below the stated values e.g. 0.9, 9.3 and 45.9 micrometers respectively for the raw ash. This example shows the ability of the current invention to produce cementitious fly ash with decreased particle size, improved size distribution, and increased surface area via dry pulverization.

EXAMPLE 3

Dry Pulverization of Bituminous Coal Fly Ash to Enhance Particle Size Distribution and Surface Area Table 3 compares bituminous coal fly ash quality after sonication for 1 minute at 90 to 120 Hz frequency, in a baffled (3 baffles) 3 liter sonication chamber at 20-25 kilowatts input power using 1.18 mm steel shot grinding media without water addition. The bulk grinding media volume and bulk ash volume were approximately 60% and 40% respectively of the sonication chamber volume.

TABLE 3

| | Raw Ash | Dry Pulverized | % Improvement Dry Pulverization vs. Raw Bituminous Ash |
|---|---|---|---|
| D10 μm | 7.5 | 5.9 | 21 |
| D50 μm | 36.5 | 13.4 | 63 |
| D90 μm | 99.1 | 31.3 | 68 |
| Specific Surface Area (m²/g) | 0.56 | 1.31 | 234 |

This example shows the ability of the current invention to produce bituminous fly ash with enhanced particle size distribution and surface area via dry pulverization.

EXAMPLE 4

Wet Pulverization of Bituminous Coal Fly Ash to Enhance Particle Size Distribution and Surface Area In Example 4, wet pulverization of the same bituminous ash as that used in Example 3 was used. The apparatus used was the same as that for Examples 2 and 3. The grinding media load was approximately 62-65% of the reaction chamber volume. The rest of the volume (38-35%) was filled up by a mixture of the bituminous ash and water (typically in a volume ratio of 2.38:1—solids to water). Table 4 compares bituminous coal fly ash quality after sonication for 1 minute at 20-25 kilowatts input power using 1.18 mm steel shot grinding media. After pulverization, the media was separated using a vibrating sieve and water stream. Table 4 compares bituminous coal fly ash quality after sonication.

TABLE 4

| | Raw Ash | Wet Pulverized | % Improvement Wet Pulverization vs. Raw Bituminous Ash |
|---|---|---|---|
| D10 μm | 7.5 | 0.97 | 87 |
| D50 μm | 36.5 | 4.4 | 88 |
| D90 μm | 99.1 | 11.4 | 88 |
| Specific Surface Area (m²/g) | 0.56 | 2.74 | 489 |

EXAMPLE 5

Comparison of Dry vs. Wet Pulverization (Example 3 vs. 4)

TABLE 5

|  | Raw Ash | Dry Pulverized | Wet Pulverized | % Improvement Wet vs. Dry Pulverization |
|---|---|---|---|---|
| D10 μm | 7.5 | 5.9 | 0.97 | 84 |
| D50 μm | 36.5 | 13.4 | 4.4 | 67 |
| D90 μm | 99.1 | 31.3 | 11.4 | 64 |
| Specific Surface Area ($m^2/g$) | 0.56 | 1.31 | 2.74 | 52 |

This example shows the ability of the current invention to rapidly wet pulverize pozzolanic fly ash and the dramatic enhancement of water on ash pulverization in the presence of grinding media.

Examples 6 and 7 show improvements in compressive strength achieved with the use of cementitious and pozzolanic materials treated according to the current invention. All compressive strength testing and sample preparation was done according to the ASTM-C311 and ASTM-C618 standards and procedures. The ingredients used in the mortar mixtures were high purity silica sand ("Ottawa sand"), ordinary Portland cement Type I, water and appropriate amounts of fly ash, as shown below. The total amount of cementitious and pozzolanic materials used was the same for each test.

EXAMPLE 6

Upgraded Bituminous Coal Fly Ash Used as a Pozzolan in Blended Cement

Bituminous coal fly ash was wet pulverized in an acoustic frequency sonicator and then treated in a one-stage flotation cell, without pH adjustment, to reduce its carbon content. The resulting ash was then combined with water and cement with a water to cement ratio by weight of 0.36. The control (Portland Cement) and the silica fume were used "as is" (i.e. not subjected to sonic conditioning, flotation or pulverization).

TABLE 6

|  | Control | 7.5 wt % Silica Fume | 7.5 wt % Fly Ash |
|---|---|---|---|
| Water Demand (%) | 100 | 112 | 99 |
| 1 day, MPa* (%) | 24.1 (100) | 20.5 (85) | 22.6 (94) |
| 7 day, MPa* (%) | 36.1 (100) | 37.3 (103) | 35.9 (99) |
| 28 day, MPa* (%) | 44.2 (100) | 44.7 (101) | 44.1 (100) |

*compressive strength in megapascals (MPa), bracketed values are ratioed to the control value normalized to 100

This example shows that sonicated low-carbon pulverized pozzolanic fly ash can be used as a substitute for Portland cement or silica fume in cement compositions to achieve similar compressive strength (e.g. 28 days). Silica fume is expensive so there is a dramatic cost savings in using the much lower cost product of the current invention.

EXAMPLE 7

Upgraded Bituminous Coal Fly Ash Used as a Pozzolan in Blended Cement

Bituminous coal fly ash was wet pulverized in an acoustic frequency sonicator for 2 minutes and then treated in a one-stage flotation cell, without pH adjustment (i.e. natural pH 7.0), to reduce its carbon content. The resulting ash was then combined with water and cement with a water to cement ratio by weight of 0.36. The compressive strength (in megapascals) at various degrees of substitution and at various points in time was measured:

TABLE 7

| Age days | Control | 10 wt %* ash | 15 wt % ash | 20 wt % ash | 25 wt % ash |
|---|---|---|---|---|---|
| 1 | 19.2 | 20.5 | 21.2 | 19.0 | 17.8 |
| 3 | 31.9 | 32.0 | 31.4 | 29.7 | 29.5 |
| 7 | 37.6 | 36.4 | 36.6 | 34.3 | 34.3 |
| 28 | 46.0 | 49.6 | 46.8 | 45.4 | 45.2 |
| 56 | 48.2 | 55.0 | 55.8 | 52.4 | 52.2 |

*weight %

This example shows that sonicated, low-carbon pulverized pozzolanic fly ash can be used as a low cost substitute for Portland cement to achieve similar or higher compressive strength even at 1 day.

EXAMPLE 8

Wet Pulverization and Flotation of Bituminous Coal Fly Ash to Decrease Carbon Content and Sulphur Content This experiment illustrates wet carbon removal and sulphur removal of 63% and 56% respectively, via acoustic frequency wet sonic pulverization with 1.18 mm steel shot media for 2 minutes followed by one stage flotation (no pH adjustment) for bituminous coal fly ash.

TABLE 8

| Element Oxide | Raw Ash (wt %) | Upgraded Ash (wt %) |
|---|---|---|
| $SiO_2$ | 49.3 | 49.6 |
| $Al_2O_3$ | 26.1 | 26.5 |
| $Fe_2O_3$ | 9.37 | 12.4 |
| MgO | 0.57 | 0.57 |
| CaO | 0.57 | 0.54 |
| $Na_2O$ | 0.2 | 0.2 |
| $K_2O$ | 1.72 | 1.75 |
| $P_2O_5$ | 0.11 | 0.12 |
| MnO | 0.08 | 0.09 |
| $Cr_2O_3$ | 0.05 | 0.05 |
| $V_2O_5$ | 0.05 | 0.04 |
| Carbon | 9.54 | 3.49 |
| S | 0.09 | 0.04 |
| Total Alkali | 1.33 | 1.35 |
| LOI* | 16.4 | 4.12 |

*loss on ignition

Experiment 9

Wet Pulverization and Flotation of Bituminous Coal Fly Ash to Decrease Carbon Content Bituminous coal combustion fly ash (0.85 kg) was mixed with 8.75 kg of 1.18 mm steel shot and 0.61 liters of water in a single 3 liter capacity acoustic frequency sonication chamber. This mixture was sonicated for 3 minutes with a 20 kilowatt sonicator. After sonication, the pulverized fly ash was separated from the grinding media with a 0.5 mm pore size sieve. This procedure was repeated to generate 4.2 kg of pulverized and grinding media free combustion ash. This pulverized ash was added to a 77 liter flotation cell filled with water containing 1.37 g/L acetic acid to reduce the pH to 4, plus 2.2 g Dowfroth® and 3 g of kerosene. This mixture was allowed to mix for 3 minutes and then aerated for 10 minutes. The air supply was turned off and the post-flotation ash was allowed to settle. Water was decanted from the post flotation ash followed by ash drying at 110° C. This one stage flotation achieved carbon reduction of 72.5% from 8.0 wt % to 2.2 wt %.

Experiment 10

Wet Pulverization and Flotation of Bituminous Coal Fly Ash to Reduce Ammonia Nitrogen Content and Sulphur Content Wet pulverization for 3 minutes using the apparatus and media of Example 4 was used to achieve 99% and 37% reduction of ammonia nitrogen and total sulphur respectively in bituminous fly ash containing 192 µg/g ammonia nitrogen and 0.19 wt % sulphur.

SUMMARY

From the foregoing description, the novelty, utility, and means of making, practising, and using our invention will be readily comprehend. It is to be understood that the invention is not limited to the embodiments and examples disclosed above but encompasses any and all embodiments lying within the scope of the claims that follow and the foregoing disclosures, including the figures.

We claim:

1. A method for producing enhanced combustion ash, said method comprising the steps of exposing combustion ash to a primary process in a chamber having a chamber volume (CV), wherein said primary process comprises the steps of:
   (a) charging the chamber with a volume of the combustion ash;
   (b) charging the chamber with at least one grinding medium, wherein components of the grinding medium have a maximum diameter of no more than about 2 mm; and,
   (c) pulverizing the combustion ash by applying sonic energy in the frequency range of 20 Hz-400 Hz to the chamber to pulverize the combustion ash in minutes.

2. The method of claim 1 wherein the sonic energy applied at Step (c) is at an acoustic frequency of 90 Hz-400 Hz.

3. The method of claim 1 wherein the sonic energy is applied for no longer than 3 minutes.

4. The method of claim 1 wherein the grinding medium defines a true grinding medium volume (TMV) that is calculated by dividing the weight of the grinding medium by the specific gravity of the grinding medium, and wherein a ratio of the TMV to the CV is at least 0.29.

5. The method of claim 1 further comprising the step of exposing the combustion ash to a secondary process, wherein said secondary process is at least one of triboelectric separation, air classification, vibratory separation, and sieving.

6. The method of claim 1 further comprising the step of adding a liquid to the chamber.

7. The method of claim 6 wherein the liquid is water.

8. The method of claim 6 wherein the grinding medium defines a true grinding medium volume (TMV) that is calculated by dividing the weight of the grinding medium by the specific gravity of the grinding medium, and wherein the a ratio of the TMV to the CV is at least 0.29.

9. The method of claim 6 further comprising the steps of:
   (d) draining the liquid from the pulverized combustion ash;
   (e) drying the combustion ash; and,
   (f) exposing the combustion ash to a secondary process, wherein said secondary process is at least one of triboelectric separation, air classification, vibratory separation, and sieving.

10. The method of claim 6 further comprising the step of exposing the combustion ash to a secondary process, wherein said secondary process is froth flotation.

11. The method of claim 10 further comprising the step of adjusting the pH of a slurry produced by the addition of the liquid to the combustion ash, wherein the pH is adjusted to between about 4 and about 7.

12. The method of claim 6 wherein the sonic energy applied at Step (c) is at an acoustic frequency.

13. A method for producing enhanced combustion ash, said method comprising the steps of exposing combustion ash to a primary process in a chamber having a chamber volume, wherein said primary process comprises the steps of:
   (g) charging the chamber volume (CV) with a volume of the combustion ash;
   (h) charging the chamber with a grinding medium, wherein the grinding medium defines a true grinding medium volume (TMV) that is calculated by dividing the weight of the grinding medium by the specific gravity of the grinding medium, and wherein a ratio of TMV to CV is at least 0.29; and,
   (j) pulverizing the combustion ash by applying sonic energy in the frequency range of 20 Hz-400 Hz to the chamber.

14. The method of claim 13 wherein the sonic energy applied at Step (j) is at an acoustic frequency of 90 Hz-400 Hz.

15. The method of claim 13 wherein the sonic energy is applied for no longer than 3 minutes.

16. The method of claim 13 wherein the components of the grinding medium have a maximum diameter of no more than about 2 mm.

17. The method of claim 13 further comprising the step of exposing the combustion ash to a secondary process, wherein the secondary process is at least one of triboelectric separation, air classification, vibratory separation and sieving.

18. The method of claim 13 further comprising the step of adding a liquid to the chamber to produce a slurry of the combustion ash.

19. The method of claim 18 wherein the liquid is water.

20. The method of claim 18 wherein the components of the grinding medium have a mean diameter of no more than about 2 mm.

21. The method of claim 18 further comprising the steps of:
   (k) draining the liquid from the pulverized combustion ash;
   (l) drying the combustion ash; and,(m)exposing the combustion ash to a secondary process, wherein said secondary process is at least one of triboelectric separation, air classification, vibratory separation and sieving.

22. The method of claim 18 further comprising the step of exposing the combustion ash to a secondary process, wherein said secondary process is froth flotation.

23. The method of claim 22 further comprising the step of adjusting the pH of a slurry produced by the addition of the liquid to the combustion ash, wherein the pH is adjusted to between about 4 and about 7.

24. The method of claim 22 wherein the sonic energy applied at Step (j) is at acoustic frequency of 90 Hz-400 Hz.

25. The method of claim 22 wherein the liquid added is water.

26. A method for producing enhanced combustion ash, said method comprising the steps of exposing combustion ash to a primary process in a chamber having a chamber volume (CV), wherein said primary process comprises the steps of:
- (a) charging the chamber with a volume of the combustion ash;
- (b) charging the chamber with at least one grinding medium, wherein components of the grinding medium have a maximum diameter of no more than about 2 mm;
- (c) adding water to the chamber and pulverizing the combustion ash by applying sonic energy to the chamber;
- (d) draining the liquid from the pulverized combustion ash;
- (e) drying the combustion ash; and
- (f) exposing the combustion ash to a secondary process, wherein said secondary process is at least one of triboelectric separation, air classification, vibratory separation, and sieving.

27. A method for producing enhanced combustion ash, said method comprising the steps of exposing combustion ash to a primary process in a chamber having a chamber volume, wherein said primary process comprises the steps of:
- (g) charging the chamber volume (CV) with a volume of the combustion ash;
- (h) charging the chamber with a grinding medium, wherein the grinding medium defines a true grinding medium volume (TMV) that is calculated by dividing the weight of the grinding medium by the specific gravity of the grinding medium, and wherein a ratio of TMV to CV is at least 0.29;
- (i) adding a liquid to the chamber to produce a slurry of the combustion ash;
- (j) pulverizing the combustion ash by applying sonic energy to the chamber;
- (k) draining the liquid from the pulverized combustion ash;
- (l) drying the combustion ash; and
- (m) exposing the combustion ash to a secondary process, wherein said secondary process is at least one of triboelectric separation, air classification, vibratory separation and sieving.

* * * * *